March 20, 1934. J. P. L. REMY-NERIS 1,951,489
PROCESS FOR THE PRODUCTION OF A COMPOUND FERTILIZER
Filed Nov. 18, 1929
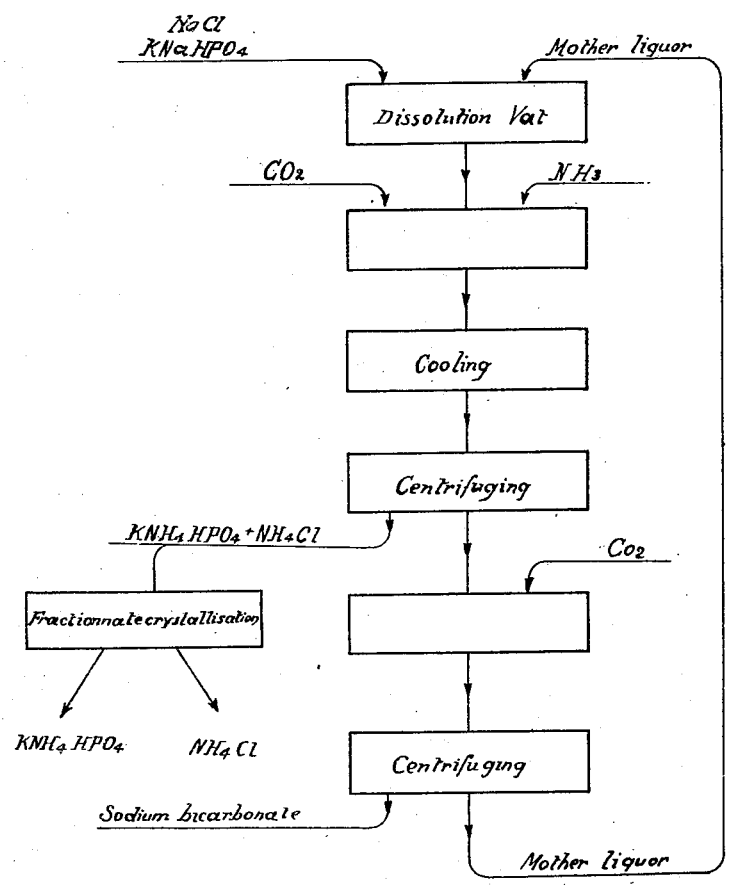
INVENTOR
Jean P.L. Remy-Neris
BY
ATTORNEY Patented Mar. 20, 1934

1,951,489

UNITED STATES PATENT OFFICE 1,951,489

PROCESS FOR THE PRODUCTION OF A COMPOUND FERTILIZER

Jean Paul Louis Remy-Neris, Paris, France, assignor to Societe Chimique de la Grande Paroisse, Azote et Produits Chimiques, Paris, France, a corporation of France Application November 18, 1929, Serial No. 408,166
In France November 23, 1928

4 Claims. (Cl. 71—9)

Technical research is now directed towards the problem of the obtaining for agricultural purposes chemically prepared fertilizers comprising two or even three of the fertilizing elements nitrogen, phosphoric acid and potash in their state of maximum concentration. Such fertilizers possess, over the two- or three-element fertilizers obtained up to the present by mixing, a decided superiority as far as transportation and handling costs are concerned: they will allow the vegetable species to be supplied with a food more assimilable than simple fertilizers used alone, or even compounded fertilizers; the particular advantage of a three-element fertilizer residing in that it provides a whole food which will contribute in the highest degree to improve the crop both in quality and quantity.

In the co-pending U. S. patent application No. 404,517, filed on Nov. 2, 1929 for "A compound fertilizer and process for manufacturing same", an analysis is given which deals with a binary nitric, ammoniacal and potassic fertilizer and the process for its manufacture.

The present invention relates to the chemical production of:—

1. Binary phospho-nitrated fertilizers through the action of ammonia, carbon dioxide and water upon a sodium phosphate with the object of replacing the sodium element therein by the ammonium element, with a concomitant production of sodium bicarbonate, the process being carried out in any one of the forms used in connection with sodium chloride for the precipitation of the sodium bicarbonate and ammonium chloride from the same solution.

In the Schreib process, see German Patent No. 36,093 to Schreib, sodium chloride is treated in the following steps:

Sodium chloride, ammonia and carbon dioxide are introduced into the mother liquor used in a cycle and from which sodium bicarbonate has been separated in the course of a previous operation. The solution is cooled, and the ammonium chloride which is precipitated is separated out. The remaining mother liquor is treated with carbon dioxide, which precipitates sodium bicarbonate. This is separated out, and the mother liquor is returned to the process.

Other processes have been based on the Schreib process and similarly treat mixtures containing sodium chloride.

2. Ternary phosphate-, ammonia- and potash-containing fertilizers, by combining the reaction indicated under paragraph 1, extended to the various phosphates which contain at least one sodium element, with a preparatory double-decomposition reaction between a sodium salt of phosphoric acid and potassium chloride, in order to obtain a mixture of sodium chloride and either potassium phosphate or sodium-potassium phosphate or both, which mixture may also contain some of the initial sodium phosphate and potassium chloride, or only one of the said salts where the process is not carried out up to the end, or comprises non-equimolecular proportions of the two salts involved. The sodium element of the sodium salts in the mixture is replaced by the ammonium radical, and the ammonium or potassium or ammonium-potassium phosphates will be precipitated together with the ammonium chloride, the sodium bicarbonate being collected separately.

3. Ternary fertilizers, containing phosphates, potash, and both ammoniacal and nitric-nitrogen, by using all the possible combinations of the processes as indicated under paragraphs 1 or 2, or both, with those indicated in the above mentioned U. S. patent application, which combinations may lead to very intricate fertilizers in which ammonium chloride; ammonium, ammonium-potassium and potassium phosphates; ammonium nitrate; potassium nitrate; and potassium chloride may be present together.

An embodiment of this invention is described hereinafter by way of non-limitative example, in which a valuable combination of the processes indicated is used.

The accompanying drawing contains a flow diagram of my process.

Starting with an equimolecular mixture of disodium phosphate and potassium chloride, transformation of said mixture into sodium-potassium phosphate and sodium chloride is carried out according to the equation:—

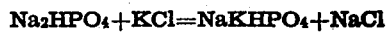

$$Na_2HPO_4 + KCl = NaKHPO_4 + NaCl$$

A mixture of the two latter salts is thus obtained either in a wholly solid state or partly in the solid state and partly in the state of a solution containing in suspension crystals of one or both salts; the mixture is then treated according to the reactions:—

2. 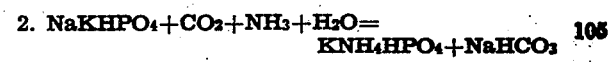
$$NaKHPO_4 + CO_2 + NH_3 + H_2O = KNH_4HPO_4 + NaHCO_3$$

3. 
$$NaCl + CO_2 + NH_3 + H_2O = NH_4Cl + NaHCO_3$$

The ammonium-potassium phosphate is precipitated together with the ammonium chloride, and a fertilizer is obtained which corresponds approximately to the formula:

4. $KNH_4PO_4.NH_4Cl$ corresponding in 100 kgs. to
{ 16.5 kgs. ammoniacal N
34.5 kgs. $P_2O_5$
22.7 kgs. $K_2O$, the sodium bicarbonate being precipitated separately.

It is possible to separate the ammonium chloride from the ammonium-potassium phosphate obtained by taking advantage of the different solubilities of these salts, a definite chemical compound being thus obtained in which the three fertilizing elements are contained all together and the percentage of which in fertilizing elements is very high, as it amounts to a total of 82.8%, namely, $K_2O$, 29.5%; N, 8.7%; and $P_2O_5$, 44.6%.

Obviously, the sodium salts of phosphoric acid used in the various embodiments of this invention, and particularly in the last mentioned example, can be prepared in any suitable manner; the disodium phosphate can be produced from natural calcium phosphate, without passing through the intermediary of phosphoric acid, by using the reaction:—

5. $Ca_3(PO_4)_2 + H_2SO_4 = 2CaHPO_4 + CaSO_4$, and one of the reactions:—

6. $CaHPO_4 + Na_2CO_3 = Na_2HPO_4 + CaCO_3$, or

7. $CaHPO_4 + 2NaHCO_3 = Na_2HPO_4 + CaCO_3 + CO_2 + H_2O$.

The disodium phosphate is particularly valuable, as by employing it, the instant invention allows natural phosphates to be converted into complete fertilizers, particularly if the process is carried out according to the example described without the intermediary of phosphoric acid; as compared to known processes, the one under consideration affords considerable savings in the amount of acid necessary for the treatment of natural phosphate; moreover, plant upkeep costs are less than in the case of known processes, as no acid products are involved in the reactions other than reaction 5.

Obviously, there may be used in Equation 7 some of the sodium bicarbonate obtained from the application of the process itself, or in Equation 6 some of the sodium carbonate obtained by calcinating the said bicarbonate. Therefore, in the above-described embodiment, a closed cycle will be obtained for the sodium, and such complete fertilizers as the one in Formula 4 will be obtained from such materials as natural phosphates, sulphuric acid, potassium chloride and a permanent amount of sodium carbonate or bicarbonate, the sodium bicarbonate obtained serving only for the renewal of the initial amount.

The calcium sulphate or carbonate obtained in the course of the process may, for instance, be used in a secondary manufacture of ammonium sulphate and calcium nitrate.

Moreover, the calcium carbonate is obtained in the precipitated form, which increases its value if it is to be used as a calcareous fertilizer.

I claim as my invention:

1. A process for the manufacture of a compound fertilizer, which comprises treating a phosphate containing at least one sodium element, with carbon dioxide, ammonia and water, whereby sodium bicarbonate and an ammonium salt of phosphoric acid are formed.

2. A process for the manufacture of a compound fertilizer, which comprises adding to a liquor used in a cycle and from which sodium bicarbonate has been separated in the course of a previous operation, a phosphate containing at least one sodium element, ammonia and carbon dioxide, collecting the precipitated ammonium salt of phosphoric acid, treating the remaining liquor with carbon dioxide, collecting the precipitated sodium bicarbonate and returning the remaining liquor to the process.

3. A process for the manufacture of a compound fertilizer, which comprises treating a mixture containing a potassium sodium salt of phosphoric acid prepared by the action of potassium chloride on di-sodium phosphate with carbon dioxide ammonia and water, collecting the precipitated ammonium-potassium salts of phosphoric acid and ammonium chloride, treating the remaining liquor with carbon dioxide, collecting the precipitated sodium bicarbonate returning the remaining liquor to the process, and separating by fractional crystallization the mixture of ammonium-potassium phosphate and ammonium chloride into its constituents.

4. A process for the manufacture of a compound fertilizer comprising effecting a reaction between di-sodium phosphate and potassium chloride to produce a mixture of a potassium sodium salt of phosphoric acid and sodium chloride, treating a solution containing the mixture with carbon dioxide and ammonia, precipitating a mixture of ammonium-potassium phosphate and ammonium chloride from the reaction mass, and separately precipitating sodium bicarbonate.

JEAN PAUL LOUIS REMY-NERIS.